Oct. 19, 1948.  C. B. LINN  2,451,568
TREATMENT OF HYDROCARBONS
Filed Oct. 25, 1945
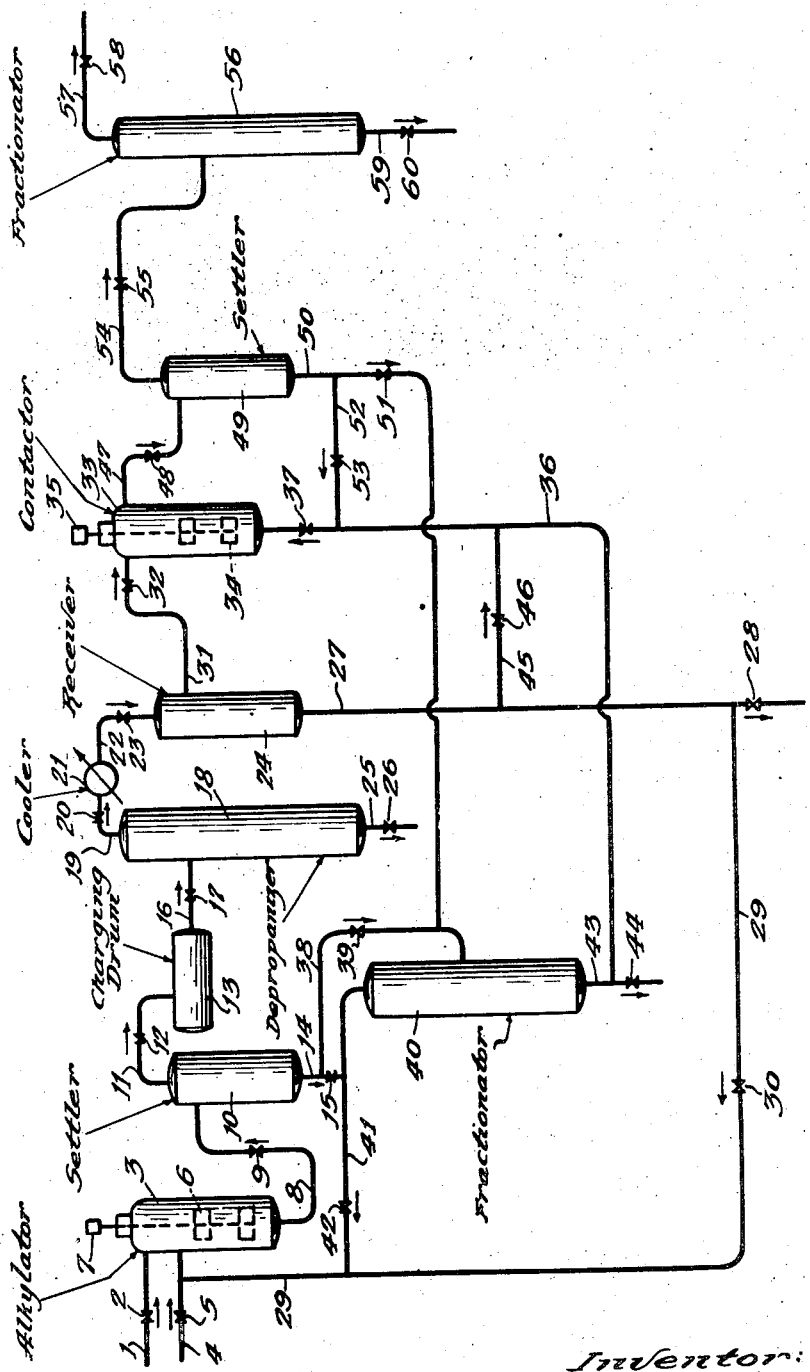
Inventor:
Carl B. Linn
By: Maynard P. Venema
Attorney Patented Oct. 19, 1948

2,451,568

UNITED STATES PATENT OFFICE 2,451,568

TREATMENT OF HYDROCARBONS

Carl B. Linn, Riverside, Ill., assignor to Universal Oil Products Company, Chicago, Ill., a corporation of Delaware Application October 25, 1945, Serial No. 624,508

8 Claims. (Cl. 260—676)

This invention relates to a process for treating a hydrocarbon or hydrocarbon mixture which is contaminated by small amounts of organic fluorine compounds to remove fluorine therefrom. More specifically, it relates to the treatment of hydrocarbons produced synthetically in the presence of an active fluoride catalyst to remove small amounts of organically combined fluorine present in compounds admixed with the hydrocarbon or hydrocarbons.

The invention is particularly adapted to the treatment of hydrocarbons produced by the alkylation of isoparaffinic hydrocarbons with olefinic hydrocarbons or with alkyl fluorides using active fluoride catalysts including hydrogen fluoride or fluoride mixtures comprising essentially hydrogen fluoride and boron fluoride. The process is also applicable to the removal of alkyl fluorides from propane and butane fractions, the latter comprising particularly normal butane recovered from the gaseous products discharged form an alkylation plant in which a butane or pentane fraction is alkylated by propylene present in a propane-propylene fraction.

An object of this invention is to defluorinate a hydrocarbon or hydrocarbon mixture contaminated by relatively small amounts of organic fluorine compounds, particularly alkyl fluorides.

Another object of this invention is to dehydrofluorinate an isoparaffin alkylation product formed in the presence of an active fluoride catalyst.

A further object of this invention is to remove alkyl fluorides from hydrocarbon conversion products formed in the presence of an active fluoride catalyst.

A still further object of this invention is to remove alkyl fluorides from a fraction of normally gaseous paraffinic hydrocarbons recovered from the products formed in the alkylation of isobutane by olefins present in a $C_3$—$C_4$ hydrocarbon fraction.

Another object of this invention is to remove ethyl fluoride from a propane fraction recovered from the products formed in the alkylation of isobutane in the presence of hydrogen fluoride with a propane-propylene fraction containing a relatively small amount of ethylene.

One specific embodiment of the present invention comprises a process for treating hydrocarbon material containing as an impurity a relatively small percentage of organically combined fluorine to remove fluorine therefrom which comprises contacting said material with a mixture of liquid hydrogen fluoride and a hydrogen fluoride sludge resulting from the treatment of hydrocarbons with liquid hydrogen fluoride.

Another embodiment of the present invention comprises a process for treating hydrocarbon material containing as an impurity a relatively small percentage of organically combined fluorine to remove fluorine therefrom which comprises contacting said material with a mixture of liquid hydrogen fluoride and the organic constituents of a hydrogen fluoride sludge resulting from the treatment of hydrocarbons with liquid hydrogen fluoride.

A further embodiment of the present invention comprises a process for treating hydrocarbon material containing as an impurity a relatively small percentage of organically combined fluorine to remove fluorine therefrom which comprises contacting said material with a mixture of from about 40 to about 90% by volume of liquid hydrogen fluoride and from about 60 to about 10% by volume of the organic constituents of a hydrogen fluoride sludge resulting from the treatment of hydrocarbons with liquid hydrogen fluoride.

A still further embodiment comprises a process for treating hydrocarbons recovered from an alkylation process in which an alkylatable paraffin is alkylated with an olefin having at least 3 carbon atoms per molecule in the presence of an active fluoride catalyst by treating said hydrocarbons with a mixture of hydrogen fluoride and the organic constituents of a hydrogen fluoride sludge formed incidental to the alkylation of an alkylatable paraffin with an olefin in the presence of an active fluoride catalyst comprising hydrogen fluoride.

The alkylation of branched chain paraffinic hydrocarbons such as isobutane and isopentane with olefinic hydrocarbons, particularly the olefinic hydrocarbons present in cracked gases, produces saturated liquid hydrocarbons utilizable as constituents of gasoline of high antiknock value. By this means relatively low boiling isoparaffinic hydrocarbons are alkylated with low boiling olefins and thereby converted into materials of higher boiling point and high antiknock values, such hydrocarbonaceous materials being particularly useful as components of aviation gasoline. The higher boiling hydrocarbons so formed from low boiling isoparaffins and olefins in the presence of an active fluoride catalyst including hydrogen fluoride or mixtures of hydrogen fluoride and boron fluoride, frequently contain small amounts of organic fluorine compounds which are not readily removable by washing with caustic and water or by fractional distillation. These contaminating fluorine compounds which are thus present in hydrocarbon mixtures are possibly due to the interaction of hydrogen fluoride with olefins to form alkyl fluorides. Some alkyl fluorides are more stable than others in the presence of active fluoride catalysts. Thus, ethyl fluoride is more stable than the higher molecular weight alkyl fluorides which may occur in an alkylation reaction mixture and is not converted completely into alkylation product but admixes with the hydrocarbon products. Some higher boiling alkyl fluorides and other organic fluorine compounds may also remain in hydrocarbon alkylation products. Because of its high stability, boiling point, and the fact that it forms with propane an azeotropic mixture boiling at −47° C., ethyl fluoride is found in the propane fraction recovered from an alkylation process utilizing a propane-propylene fraction as an olefinic charging stock. Such propane-propylene charging stocks frequently contain ethylene in small amounts and form ethyl fluoride by the addition of hydrogen fluoride to this olefin of lowest molecular weight.

Boron fluoride assists hydrogen fluoride in catalyzing the alkylation of an isoparaffin by ethylene and higher olefins, but in these cases the alkylation product also contains small quantities of organic fluorides as do those formed similarly in the presence of hydrogen fluoride from an isoparaffin and an olefin of higher molecular weight than ethylene.

Although the fluorine content of the hydrocarbon product of gasoline boiling range resulting from an alkylation treatment is rarely very high, the presence of fluorine is undesirable both from the standpoint that the combustion products of such a fuel are corrosive, as well as the fact that the antiknock value of the gasoline, generally expressed by the term "octane number" is reduced considerably either when the gasoline is used as such, or when a small amount of an antidetonating agent such as lead tetraethyl is added thereto. Thus it may be shown that gasoline fractions containing 0.1% by weight of fluorine have inferior antiknock properties, particularly as concerns their response to lead tetraethyl as compared to the otherwise same material which contains substantially no fluorine compounds. The present invention offers a method for reducing the fluorine content of the hydrocarbon alkylation product to an amount where it is no longer objectionable.

Also, propane and normal butane which are not alkylated during the alkylation treatment of an isoparaffin with a $C_3$ or a $C_4$ hydrocarbon fraction are recovered from alkylation products and used as fuels and for various industrial uses such as in the production of hydrogen. Such recovered propane and normal butane fractions are sometimes contaminated by ethyl fluoride and other organic fluorine compounds formed incidentally in the alkylation treatment and it is desirable that these propane and butane fractions be freed from fluorine compounds before being utilized as above indicated.

It is much more difficult to dehydrofluorinate ethyl fluoride than the other alkyl fluorides which may be encountered in products of the hydrogen fluoride alkylation process. It has been observed that alkylation plants which charge a propane-propylene feed stock to the alkylation reactor produce ethyl fluoride from the ethylene which often contaminates the $C_3$ feed stock. This ethyl fluoride tends to go through the plant unchanged and finally appears in the propane fraction recovered from the effluent gases. The methods used heretofore for removing organic fluorine compounds from alkylate such as passage through heated contactors containing bauxite or aluminum do not cause the dehydrofluorination of ethyl fluoride and consequently are ineffective for producing a propane fraction substantially free from fluorine. My process, however, defluorinates not only alkylate but also propane and makes it possible to produce a substantially fluorine-free propane fraction.

As indicated above, ethyl fluoride is more stable than the higher alkyl fluorides encountered in the products of the hydrogen fluoride alkylation process. Possibly one reason for this difference in stability of the alkyl fluorides is the fact that ethyl fluoride is a primary alkyl fluoride, while the alkyl fluorides produced from propylene and higher olefins are either secondary or tertiary alkyl fluorides. I have found that when propane, which is contaminated by small amounts of ethyl fluoride is treated at about 25° C. with a mixture of liquid hydrogen fluoride and a relatively large proportion of a hydrogen fluoride sludge resulting from the treatment of hydrocarbons with liquid hydrogen fluoride and containing a substantial amount of organic material, the fluorine content of the propane fraction is reduced substantially.

The hydrogen fluoride sludge used in the process of my invention may be obtained from hydrogen fluoride which has catalyzed the alkylation of an alkylatable paraffinic or naphthenic hydrocarbon by an olefin or alkyl fluoride or has catalyzed the polymerization of an olefin. In such processes the hydrocarbon alkylation or polymerization product forms an upper layer which is separated from the lower layer of used hydrogen fluoride, the latter containing a relatively small quantity of highly unsaturated cyclic organic material dissolved in the hydrogen fluoride or chemically combined with a portion of it. Such used hydrogen fluoride may be subjected to fractional distillation to separate a substantial proportion of the hydrogen fluoride from higher boiling material comprising complexes of hydrogen fluoride with unsaturated hydrocarbons of relatively high molecular weight. Because of the manner in which these sludge hydrocarbons are formed, small amounts of these complex organic materials are present in the products resulting from the alkylation of an isoparaffinic hydrocarbon with an olefin or alkyl fluoride. Accordingly, very small amounts of these complex materials may be present in alkylates containing also small amounts of alkyl fluorides which have heretofore been removed by various treatments including extraction by means of liquid hydrogen fluoride. The organic constituents of hydrogen fluoride sludge present heretofore during such treatment of an alkylate with hydrogen fluoride is small and in normal operation does not exceed a few percent of the liquid volume of the hydrogen fluoride. Now I have found that organically combined fluorine, particularly that present in alkyl fluorides, is removed from alkylates and other hydrocarbons or hydrocarbon mixtures so contaminated, by treatment with hydrogen fluoride in the presence of large amounts of the organic complex material found in hydrogen fluoride sludges preferably at temperatures substantially greater than used in the alkylation zone which is usually regulated to about 38° C. While I prefer to use mixtures of 40 to 60% of organic complex and 60 to 40% of liquid hydrogen fluoride, I may use also from about 10 to about 90% by volume of sludge complex and from about 90 to about 10% by volume of liquid hydrogen fluoride.

In addition to the hydrocarbons occurring in hydrogen fluoride sludges, other sludge hydrocarbons are also utilizable in my process. These different materials include the hydrocarbons present in sludges formed in hydrocarbon conversions, particularly alkylation and polymerization reactions, catalyzed by acid-acting catalysts and particularly by sulfuric acid and by metal halides of the Friedel-Crafts type.

According to the process of the present invention, hydrocarbon material contaminated by organic fluorine compounds is freed from a substantial proportion of such organically combined fluorine by treatment with a mixture of liquid hydrogen fluoride and sludge hydrocarbons at a temperature of from about 0° to about 150° C. and preferably at a temperature of from about 50° to about 120° C. The process is carried out at atmospheric pressure or preferably at a pressure sufficient to maintain the reaction mixture in substantially liquid phase.

The treatment of a hydrocarbon or hydrocarbon mixture containing fluoride contaminants to remove fluorine therefrom is effected in either batch or continuous types of treatment. In batch type operation one volume of the hydrocarbon or hydrocarbon mixture contaminated by organic fluorine compounds is agitated with from about 1.0 to about 2.0 volumes of the mixture of liquid hydrogen fluoride and organic constituents of a hydrogen fluoride sludge. This treatment is carried out at a temperature of from about 0° to about 150° C., at a pressure sufficient to maintain liquid phase operation, and for a time generally of from about 0.1 to about 3 hours. The resultant reaction mixture is then separated into treated hydrocarbon material, used hydrogen fluoride, and sludge. The former is washed, dried and distilled or otherwise treated to recover a desired hydrocarbon or hydrocarbon mixture substantially free from organic fluorine compounds, while the used hydrogen fluoride and recovered sludge hydrocarbons are returned to the reactor for further use in treating an additional quantity of the hydrocarbon charging stock.

Continuous treatment of a hydrocarbon containing organically combined fluorine is effected by passing said hydrocarbon and a proportioned amount of hydrogen fluoride and hydrogen fluoride sludge containing organic material through a baffled mixer or other suitable type of contacting equipment in which the hydrocarbon and defluorinating mixture are contacted at the aforementioned conditions of temperature and pressure for a time sufficient to remove substantially all of the organically combined fluorine from the hydrocarbon material. From this treating equipment the mixture of hydrocarbon material and treating reagent is directed to a separator from which the hydrocarbon layer is removed, washed, dried and distilled or otherwise treated to recover the desired hydrocarbons substantially free from fluorine-containing compounds. The used mixture of hydrogen fluoride and sludge hydrocarbon mixture is then withdrawn from the separator and at least a portion thereof is recycled to further use in treating an additional quantity of the mentioned charging stock.

In order to illustrate further the process of my invention, the attached diagrammatic drawing is given to indicate one arrangement of equipment that may be utilized in defluorinating a propane fraction containing ethyl fluoride and recovered from a process in which an isoparaffin is alkylated with an olefinic material containing small amounts of ethylene.

By means not illustrated in the drawing, isobutane and a propane-propylene fraction containing small amounts of ethylene are directed through line 1 containing valve 2 to alkylator 3 containing liquid hydrogen fluoride admitted thereto through line 4 containing valve 5. Alkylator 3 is also provided with suitable cooling or heating means and also with stirrer 6 operated by prime mover 7. From alkylator 3 the reaction mixture is directed through line 8 containing valve 9 to settler 10 in which the used hydrogen fluoride catalyst separates as a lower layer from the upper hydrocarbon layer, the latter being then discharged from settler 10 through line 11 and valve 12 to charging drum 13, while the used hydrogen fluoride is withdrawn through line 14 containing valve 15 to further treatment and use as hereinafter set forth.

From charging drum 13, the hydrocarbon layer comprising alkylate, unconverted butane fraction, propane, dissolved hydrogen fluoride, and small amounts of alkyl fluorides, particularly ethyl fluoride, is directed through line 16 and valve 17 to depropanizer 18 wherein a relatively low boiling mixture comprising essentially propane, ethyl fluoride, and hydrogen fluoride is vaporized and discharged through line 19, valve 20, cooler 21, line 22, and valve 23 to receiver 24. The higher boiling material comprising alkylate and unconverted butane is discharged from depropanizer 18 through line 25 and valve 26 to further treatment and use not illustrated in the diagrammatic drawing.

In receiver 24, an upper layer comprising essentially propane contaminated with ethyl fluoride is separated from a lower layer comprising essentially liquid hydrogen fluoride, the latter being withdrawn from receiver 24 through line 27 containing valve 28. At least a portion of the used hydrogen fluoride which is discharged through line 27 is recycled therefrom through line 29 and valve 30 to line 4, already mentioned, through which fresh hydrogen fluoride is introduced to alkylator 3. From receiver 24, the upper layer comprising essentially propane and dissolved ethyl fluoride is passed through line 31 containing valve 32 to contactor 33 provided with stirrer 34 operated by prime mover 35. In contactor 33 a substantial proportion of the ethyl fluoride is removed from the upper layer comprising essentially propane by treatment with hydrogen fluoride sludge hydrocarbons and liquid hydrogen fluoride directed thereto through line 36 and valve 37 as hereinafter set forth.

Hydrogen fluoride used as catalyst in alkylator 3 and separated from the hydrocarbon layer in settler 10 is directed therefrom through line 14, line 38, and valve 39 to fractionator 40 used for regenerating hydrogen fluoride by a method comprising essentially fractional distillation by which hydrogen fluoride is separated from relatively high boiling highly unsaturated hydrocarbons also referred to herein as hydrogen fluoride sludge hydrocarbons. It may be advantageous to employ in fractionator 40 a packing material of certain metals such as steel, brass, etc., in the form of rings or some other shape which can be arranged compactly in the fractionator, while at the same time offering a large surface area. At elevated temperatures, such materials have been shown to modify the sludge hydrocarbons in regard to their olefinic character and in other ways. The regenerated hydrogen fluoride is directed from fractionator 40 through line 41, valve 42, and lines 29 and 4, already mentioned, to alkylator 3, while the sludge hydrocarbons are discharged from near the bottom of fractionator 40 through line 43 containing valve 44. At least a portion of the sludge hydrocarbon material is directed from line 43 through line 36 and valve 37 to contactor 33, already mentioned, in which a hydrocarbon material containing an alkyl fluoride is defluorinated in the presence of said sludge hydrocarbons and also of liquid hydrogen fluoride which is conveniently directed from line 27 through line 45, valve 46, line 36 and valve 37 to contactor 33.

The effluent from contactor 33 is passed through line 47 and valve 48 to settler 49 from which a lower layer comprising essentially hydrogen fluoride and sludge hydrocarbons is directed through line 50 containing valve 51. A portion of the mixture of hydrogen fluoride and sludge hydrocarbons being discharged through line 50 is recycled therefrom through line 52 and valve 53 and thence through line 36 and valve 37 to contactor 33, while the remainder of said mixture is directed from line 50 to line 38 and thence to fractionator 40 in which a hydrogen fluoride fraction containing a high proportion of hydrogen fluoride is separated from higher boiling sludge hydrocarbons. From the top of settler 49, the propane fraction, thus substantially freed from ethyl fluoride but containing some dissolved hydrogen fluoride, is discharged through line 54 and valve 55 into fractionator 56 from which a mixture of hydrogen fluoride and substantially defluorinated propane is discharged through line 57 and valve 58 to further treatment or use not illustrated in the diagrammatic drawing, while a substantially pure propane fraction free from hydrogen fluoride and alkyl fluorides is withdrawn from the bottom of fractionator 56 through line 59 and valve 60.

Although the foregoing diagrammatic drawing illustrates the manner in which a propane fraction recovered from the alkylation product may be freed from ethyl fluoride, it is evident to one skilled in the art that substantially the same form of equipment is also utilizable when it is desired to defluorinate an alkylate or alkylate fraction which contains small amounts of organically combined fluorine such as alkyl fluorides. Thus, an isoparaffinic alkylate such as that present in admixture with butane and being discharged from depropanizer 18 through line 25 and valve 26 could be debutanized and then subjected to defluorination treatment in contactor 33 in the presence of liquid hydrogen fluoride and sludge hydrocarbons. The hydrogen fluoride employed with the sludge hydrocarbons could be either substantially anhydrous hydrogen fluoride charged from an outside source, or it could be regenerated hydrogen fluoride or hydrogen fluoride which has been used in the alkylation process and separated from the alkylation products as herein set forth.

The following example is given to show results obtained in the operation of the process, but it is not to be considered to limit unduly the broad scope of the invention.

A turbomixer of 1000 cc. capacity was charged with 132 grams of used hydrogen fluoride containing about 40% by weight of sludge hydrocarbons, 157 grams of substantially anhydrous hydrogen fluoride, and 102 grams of propane containing 1.2% by weight of fluorine present as ethyl fluoride. These materials were then contacted in the turbomixer at 25° C. for 2 hours after which the treated propane was removed therefrom, separated from hydrogen fluoride, and found to contain 0.27% by weight of fluorine. The treatment with hydrogen fluoride and sludge hydrocarbons thus removed 76% of the ethyl fluoride from the propane fraction charged. The defluorinating efficiency of the process can be improved by using a higher temperature of treatment and preferably using a temperature of from about 50° to about 120° C. in order to obtain more complete removal of fluorine.

The nature of the present invention and the type of results obtained thereby are evident from the preceding specification and example, although neither section is to be construed to limit unduly the broad scope of the invention.

I claim as my invention:

1. A process for treating a hydrocarbon material containing as an impurity a relatively small percentage of organically combined fluorine to remove fluorine therefrom which comprises contacting said hydrocarbon material at a temperature of from about 0° C. to about 150° C. with a liquid mixture of hydrogen fluoride and the organic constituents of a sludge resulting from the treatment of hydrocarbons with a sludge-forming hydrocarbon conversion catalyst, said mixture containing from about 40% to about 90% of said organic constituents, and recovering the treated hydrocarbon material.

2. A process for treating a hydrocarbon material containing as an impurity a relatively small percentage of organically combined fluorine to remove fluorine therefrom which comprises contacting said hydrocarbon material at a temperature of from about 0° C. to about 150° C. with a liquid mixture of hydrogen fluoride and the organic constituents of a hydrogen fluoride sludge resulting from the conversion of hydrocarbons in the presence of a hydrogen fluoride catalyst, said mixture containing from about 40% to about 90% of said organic constituents, and recovering the treated hydrocarbon material.

3. A process for treating a hydrocarbon material containing as an impurity a relatively small percentage of organically combined fluorine to remove fluorine therefrom which comprises contacting said hydrocarbon material at a temperature of from about 0° C. to about 150° C. with a liquid mixture of hydrogen fluoride and the organic constituents of a hydrogen fluoride sludge resulting from the alkylation of hydrocarbons in the presence of a hydrogen fluoride alkylation catalyst, said mixture containing from about 40% to about 90% of said organic constituents, and recovering the treated hydrocarbon material.

4. The process of claim 2 further characterized in that said contacting step is carried out at a pressure sufficient to maintain the reaction mixture in substantially the liquid phase.

5. The process of claim 2 further characterized in that from about 1 to about 2 volumes of said liquid mixture are employed in said contacting step per volume of said hydrocarbon material.

6. The process of claim 2 further characterized in that said hydrocarbon material containing the organic fluorine impurity comprises a paraffinic product from a hydrogen fluoride catalyzed alkylation reaction.

7. The process of claim 2 further characterized in that said hydrocarbon material comprises propane.

8. The process of claim 2 further characterized in that said hydrocarbon material comprises propane and the organic fluorine impurity comprises ethyl fluoride.

CARL B. LINN.

REFERENCES CITED

The following references are of record in the file of this patent:

UNITED STATES PATENTS

| Number | Name | Date |
|---|---|---|
| 2,320,629 | Matuszak | June 1, 1943 |